Nov. 28, 1961
A. CHRISTENSEN ET AL
3,010,807
MULTI-STAGE CATALYTIC CONVERSION
Filed Sept. 10, 1958
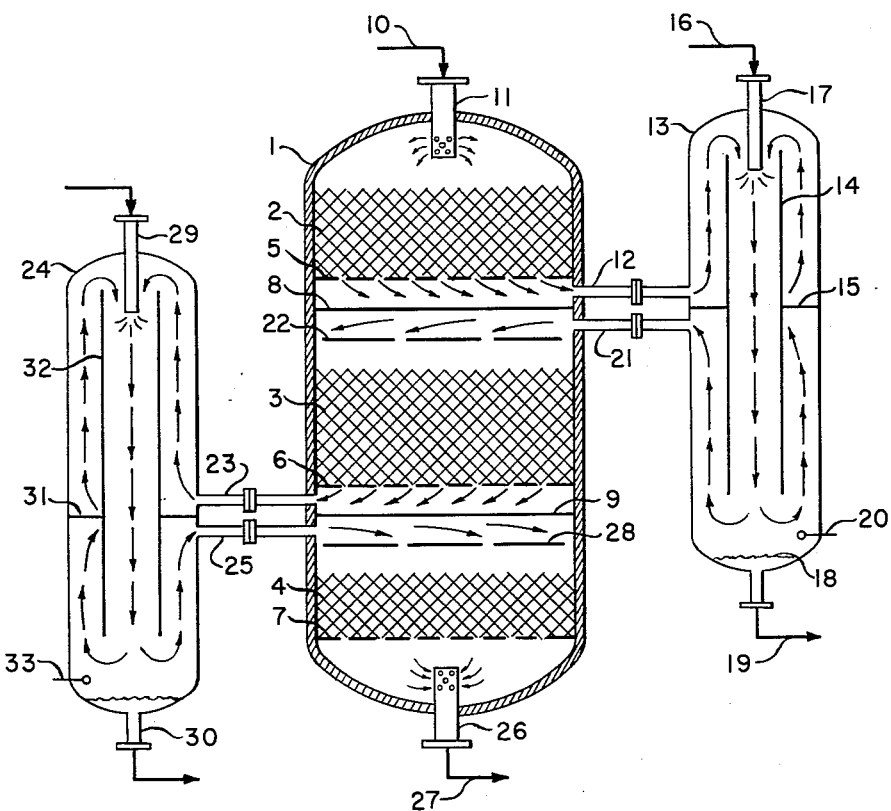
AXEL CHRISTENSEN
G. RUSSELL JAMES
INVENTORS.
BY J. W. McCloskey
AGENT 3,010,807
MULTI-STAGE CATALYTIC CONVERSION
Axel Christensen, Stamford, Conn., and George Russell James, Armonk, N.Y., assignors to Chemical Construction Corporation, New York, N.Y., a corporation of Delaware
Filed Sept. 10, 1958, Ser. No. 760,187
3 Claims. (Cl. 23—288)

This invention concerns catalytic reactions and an improved processing arrangement for such reactions in which the overall reaction is effected in a plurality of partial reaction stages within a single reactor. An apparatus arrangement is provided which allows the reactant stream to uniformly contact additional components during the course of the reaction, while preventing such additional components from adversely affecting the catalyst.

This invention particularly relates to a process for reacting carbon monoxide in a gas stream with water vapor to produce hydrogen and carbon dioxide. The reaction involved in this process is as follows:

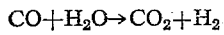

$$CO+H_2O \rightarrow CO_2+H_2$$

This reaction is widely employed in industry to produce hydrogen gas from carbon monoxide or the carbon monoxide content of mixed gases such as those produced by the reforming or partial combustion of hydrocarbons. One commercial practice consists of passing the mixed gas stream countercurrent to liquid water in a tower, so as to add water vapor to the gas stream. Then excess steam is injected into the gas stream and the resulting mixture is passed under pressure into a catalytic reactor where the above reaction takes place at elevated temperatures. The resulting product gas stream containing an increased hydrogen content is then passed on to various other processing steps not related to this invention.

In some cases a partial CO conversion is accomplished, followed by injection of liquid water into the reactor and subsequent further conversion.

This invention involves the use of reaction temperatures, pressures, and catalysts well known in the prior art. The principal novelty and contribution of this invention concerns certain practical difficulties inherent in the procedures described above. One of the most serious difficulties encountered in the prior art arises due to the introduction of liquid water in the reactor. This is undesirable since liquid water will have an adverse effect on the hot catalyst mass, causing it to shatter or crumble and altering the normal flow of gases through the catalyst.

In cases where the reaction is accomplished in several stages within a single reactor, it has been suggested to employ a spray of liquid water within the reactor between said stages. Such a procedure is unsatisfactory because, under practical operating conditions, it may result in liquid water contacting the hot catalyst bed. In addition, such a procedure results in an uneven distribution of water vapor into the gas stream.

In this invention the concept of accomplishing the reaction in a plurality of stages is employed. While two or more stages may be used, it is a common practice in these processes to employ a three-stage reactor. The reaction stages are contained in a single reaction vessel divided into sections. Between each stage of partial reaction, the gas stream is externally quench-cooled using a water spray with subsequent separation of any residual water from the gas stream. The gas stream is then returned to the next stage in the reaction vessel. The gas stream is thus cooled and additional quantities of water vapor are added. This arrangement effects the reaction in a more efficient manner, first by avoiding any possibility of liquid water coming in contact with the hot catalyst mass. At the reaction temperatures usually employed in industry if liquid water contacts the catalyst it immediately causes cracking or shattering of the catalyst.

A second improvement consists of better temperature control and more uniform distribution of water vapor into the gas stream. This benefit arises from the fact that a complete and even distribution of vaporized water into the gas stream is attained by an external water quench, as compared to a water spray or nozzles inside the vessel.

It is an object of this invention to effect catalytic reactions in an improved manner, by an apparatus arrangement which permits intermediate uniform contact of the reaction stream with components which would have an adverse effect on the catalyst, between stages of the reaction, in a system employing a plurality of partial reaction stages within a single reactor.

Another object of this invention is to effect the reaction of carbon monoxide in a gas stream with water vapor to produce hydrogen and carbon dioxide in a more convenient and efficient manner, by using a plurality of partial reaction stages within a single converter, with intermediate quench cooling external to the converter using liquid water.

A further object of this invention is to avoid any possibility of liquid water condensing in the catalyst beds from the gas stream.

Another object of this invention is to allow the use of a water quench for the gas stream, without any possibility of liquid water being deposited thereby in the catalyst beds. An additional object of this invention is to provide a process and apparatus for accomplishing the aforementioned reaction in stages with intermediate quenching for improved temperature control.

Other objects and advantages of this invention will become evident from the description which follows.

*Example*

Referring to the accompanying figure, item 1 is the shell of the insulated, high pressure reaction vessel. Items 2, 3 and 4 are catalyst beds supported on grids 5, 6 and 7 respectively. The vessel is separated into 3 distinct sections by plates 8 and 9.

The input gas stream containing carbon monoxide and water vapor enters the reaction vessel 1 via line 10 at an elevated pressure of about 360 p.s.i.g. and temperature of about 150° F. The gas stream is dispersed over catalyst bed 2 by distribution 11 which consists of a blanked-off pipe section with holes drilled in the pipe walls. It should be understood that any suitable distributing device may be used for this purpose.

The gas stream then passes through catalyst bed 2 and partial conversion of carbon monoxide to carbon dioxide is accomplished. The gas stream then passes through supporting grid 5 and is led by separating plate 8 to gas removal pipe 12 and leaves the reaction vessel. The temperature of the gas stream at this point may attain 900° F. or higher.

The gas stream is then quench-cooled by contact with a water spray. This step is shown in vessel 13; however, it must be understood that any suitable device which produces contact between a gas stream and a liquid spray and also produces a subsequent separation of the gas stream from any residual liquid may be used in this step. Hence, the internal design of vessel 13 is shown only for purposes of clarifying the function required of any device which is utilized at this step in the process.

Vessel 13 has a circular shell and an internal concentric pipe 14 is mounted vertically within the vessel, being open at top and bottom. A horizontal plate 15 is installed between 14 and 13, in this manner the vessel is divided into an upper and lower section with the central pipe 14 joining the two sections. The hot, partially converted gas stream enters vessel 13 from pipe 12 and passes upward in the annular space between 14 and 13. A liquid water stream 16 is dispersed into the gas stream by nozzle 17 as a spray. The gas stream passes vertically downward inside pipe 14 together with the liquid spray. As a result, liquid water is vaporized and absorbed into the gas stream. Any unabsorbed water collects at 18 and may be removed at 19. Alarm 20 signals if the water level becomes too high, such a condition could lead to entrainment of liquid water as the gas stream passes out of the device at 21.

Thus the gas stream is quench-cooled and a quantity of water vapor is evenly dispersed into said gas stream. The gas stream at 21 is now re-admitted to the reaction vessel and dispersed over the catalyst bed 3, with suitable baffles 22 being employed to insure uniform dispersion of the gas stream. Depending on engineering considerations, a device such as distributor 11 may also be employed at this point, or any suitable distributing device may be used for this purpose.

As the gas stream passes through catalyst bed 3, further reaction between CO and water vapor takes place and the gas temperature rises. The gas stream is removed via 23 and quench-cooled by liquid water in vessel 24. Vessel 24 with inlet 29 and outlet 30 and containing a baffle 31, a pipe 32, and a liquid level control 33, as illustrated in the figure, is a counterpart of vessel 13. The gas stream is re-admitted into vessel 1 via 25, dispersed by baffles 28, and the final stage of reaction is accomplished in catalyst bed 4. The resultant gas stream, which will now consist primarily of hydrogen and carbon dioxide, is conducted to other processing via exit pipe 26 and line 27. Pipe 26 is of a design similar to distributor 11. In this manner channeling or shirt-circuiting of the gas stream in catalyst bed 4 is avoided.

It should be understood that various mechanical or piping arrangements may be used without departing from the scope of this invention. For example, depending on engineering considerations, the water quench device 13, such as shown in the figure, may be directly attached to the side of the reaction vessel or the piping arrangement may be simplified by combining the two pipes connected to each other quench device into a single larger pipe divided into two sections by an internal separator. Thus only one flanged connection would be needed. Modifications of this nature can be accomplished without altering the basic concept of this invention.

In addition, it should be noted that the process pressure and temperatures stated in the above example are mentioned for purposes of illustration only, and are not to be interpreted as limiting the scope of this invention in any way.

Finally, it may be mentioned that processing of the gas stream with other apparatus in addition to the quench device, while external to the converter between stages of partial conversion, is within the scope of this invention. For example, depending on the particular process and process variables involved, the gas stream may be additionally heated or cooled using separate heat exchange apparatus in addition to the quench device described in this invention.

Thus, for example, formaldehyde is produced by the catalytic oxidation of gaseous methanol with air. Cooling of the partially converted gas stream and addition of further quantities of methanol could be readily accomplished using the concept revealed in this invention, with liquid methanol being employed in the quench device.

We claim:
1. Apparatus for effecting the catalytic conversion of carbon monoxide to carbon dioxide by reaction with water vapor in a plurality of partial conversion stages which comprises a reactor vessel containing a plurality of discrete catalyst beds, each of said beds being provided with a gas entry section for feed gas and a gas discharge section for removal of reacted gas stream, at least one other vessel, a conduit vertically suspended within said other vessel, said conduit being open at both ends, a substantially horizontal partition located at an intermediate level of said conduit and extending from the outer wall of said conduit to the inner wall of said other vessel, liquid water entry duct extending into said other vessel to a liquid water discharge means adjacent the upper end of said conduit, whereby liquid water is introduced into said conduit, a hot gas passage duct extending from an opening in said reactor vessel adjacent the gas discharge section of a first catalyst bed in said reactor vessel to an opening in said other vessel located vertically above said partition, and a cool gas return duct extending from an opening in said other vessel located vertically below said partition to an opening in said reactor vessel adjacent the gas entry section of a second catalyst bed in said reactor vessel.

2. Apparatus of claim 1, in which the number of discrete catalyst beds in said reactor vessel is three, a first other vessel is provided for contact of hot reacted gas with liquid water between said first and said second bed of catalyst, and a second other vessel is provided for contact of hot reacted gas with liquid water between said second and said third bed of catalyst.

3. Apparatus for gaseous catalytic reactions comprising a vertically disposed reaction vessel, at least one horizontal partition extending within said vessel whereby said vessel is divided into a plurality of discrete compartments, said compartments being provided with supported beds of solid catalyst, means above each of said beds for admittance of a gaseous process stream into the compartment for partial catalytic reaction, means below each of said beds for removal of the reacted gaseous process stream from the compartment, a vertically oriented vaporization vessel adjacent said reaction vessel, a vertically suspended open-ended conduit within said vaporization vessel, a horizontal partition extending between the outer wall of said conduit and the inner wall of said vaporization vessel, a liquid entry duct extending into said vaporization vessel to liquid discharge means adjacent the upper end of said conduit, whereby liquid is dispersed into said conduit, means for removal of excess unvaporized liquid at the lower part of said vaporization vessel, a duct extending from said means for removal of reacted gaseous process stream to means for gas entry into said vaporization vessel above said horizontal partition, and a duct extending from means for egress of vapor-saturated gas from said vaporization vessel below said horizontal partition to said means for admittance of gaseous process stream above the bed of solid catalyst in the next lower of said compartments.

References Cited in the file of this patent

UNITED STATES PATENTS

| | | |
|---|---|---|
| 968,332 | Dow | Aug. 23, 1910 |
| 2,465,235 | Kubicek | Mar. 22, 1949 |
| 2,487,981 | Reed | Nov. 15, 1949 |
| 2,829,113 | Barry et al. | Apr. 1, 1958 |

FOREIGN PATENTS

| | | |
|---|---|---|
| 892,745 | Germany | Oct. 19, 1953 |